US012636570B2

(12) United States Patent
Tsai

(10) Patent No.: US 12,636,570 B2
(45) Date of Patent: May 26, 2026

(54) CARBON FIBER SKATEBOARD HANGER WITH METAL SHIELD

(71) Applicant: Wen Tang Tsai, Taichung City (TW)

(72) Inventor: Wen Tang Tsai, Taichung City (TW)

( * ) Notice: Subject to any disclaimer, the term of this patent is extended or adjusted under 35 U.S.C. 154(b) by 286 days.

(21) Appl. No.: 18/234,369

(22) Filed: Aug. 15, 2023

(65) Prior Publication Data

US 2025/0058203 A1 Feb. 20, 2025

(51) Int. Cl.
| | |
|---|---|
| *A63C 17/01* | (2006.01) |
| *B29C 70/72* | (2006.01) |
| *B29K 307/04* | (2006.01) |
| *B29K 705/02* | (2006.01) |
| *B29L 31/30* | (2006.01) |

(52) U.S. Cl.
CPC ............ *A63C 17/017* (2013.01); *B29C 70/72* (2013.01); *B29C 2793/009* (2013.01); *B29K 2307/04* (2013.01); *B29K 2705/02* (2013.01); *B29L 2031/30* (2013.01)

(58) Field of Classification Search
CPC . B29C 70/72; B29C 2793/009; A63C 70/017; B29K 2307/04; B29K 2705/02; B29L 2031/30
USPC ....................................................... 180/11.27
See application file for complete search history.

(56) References Cited

U.S. PATENT DOCUMENTS

| | | | | |
|---|---|---|---|---|
| 4,214,768 | A * | 7/1980 | Dominy ............... | A63C 17/012 |
| | | | | 280/841 |
| 5,879,013 | A * | 3/1999 | Shih ....................... | A63C 17/01 |
| | | | | 280/809 |

| | | | | |
|---|---|---|---|---|
| 6,648,372 | B2 * | 11/2003 | Ojeda, III .......... | A63C 17/0093 |
| | | | | 280/809 |
| 6,761,369 | B1 * | 7/2004 | Anderson ............ | A63C 17/012 |
| | | | | 280/11.27 |
| 6,945,542 | B2 * | 9/2005 | Stewart ................ | A63C 17/012 |
| | | | | 280/811 |
| 7,255,356 | B2 * | 8/2007 | Lin ....................... | A63C 17/015 |
| | | | | 280/87.041 |
| 8,752,849 | B1 * | 6/2014 | Fox .................... | A63C 17/0093 |
| | | | | 280/87.042 |
| 8,888,108 | B1 | 11/2014 | Beaty et al. | |
| D725,977 | S | 4/2015 | Tsai | |
| 9,095,764 | B2 * | 8/2015 | Mete .................... | A63C 17/015 |
| 9,144,730 | B1 * | 9/2015 | Visinski ............. | A63C 17/0093 |
| D755,603 | S * | 5/2016 | Reedy ............................ | D8/105 |
| D804,274 | S | 12/2017 | Tsai | |
| 10,398,961 | B2 * | 9/2019 | McGowan ........... | A63C 17/012 |

(Continued)

FOREIGN PATENT DOCUMENTS

WO WO2016/086272 A1 6/2016

*Primary Examiner* — Hau V Phan
(74) *Attorney, Agent, or Firm* — Bycer & Marion, PLC; Matthew L. Bycer

(57) ABSTRACT

An improved hanger, such as a skateboard hanger is disclosed. More specifically, a method of manufacture and a device providing improved hanger strength, smoothness, durability, and toughness is disclosed. The improved hanger device comprises a lightweight hanger, such as a carbon fiber-based hanger coupled with a shield fashioned from one or more strong, tough, durable, impact-resistant material(s) such as aluminum. The shield functions to protect the hanger from damage upon impact with solid unyielding materials, while the lightweight hanger offers improved skateboard maneuverability, and control, particularly when the skateboard is airborne.

16 Claims, 7 Drawing Sheets

(56) References Cited

U.S. PATENT DOCUMENTS

| | | | | |
|---|---|---|---|---|
| 11,117,043 | B2 * | 9/2021 | Powell | A63C 17/012 |
| 11,224,793 | B1 * | 1/2022 | Piumarta | A63C 17/012 |
| D966,848 | S | 10/2022 | Tsai et al. | |
| 11,491,389 | B2 * | 11/2022 | Piumarta | A63C 17/015 |
| 11,491,390 | B1 * | 11/2022 | Piumarta | A63C 17/0093 |
| 2009/0140570 | A1 | 6/2009 | Houkal | |
| 2021/0197353 | A1 * | 7/2021 | Pfeiffer | B62K 21/26 |
| 2021/0197920 | A1 * | 7/2021 | Bacon | B25F 1/02 |
| 2021/0402283 | A1 | 12/2021 | Cappello et al. | |

* cited by examiner

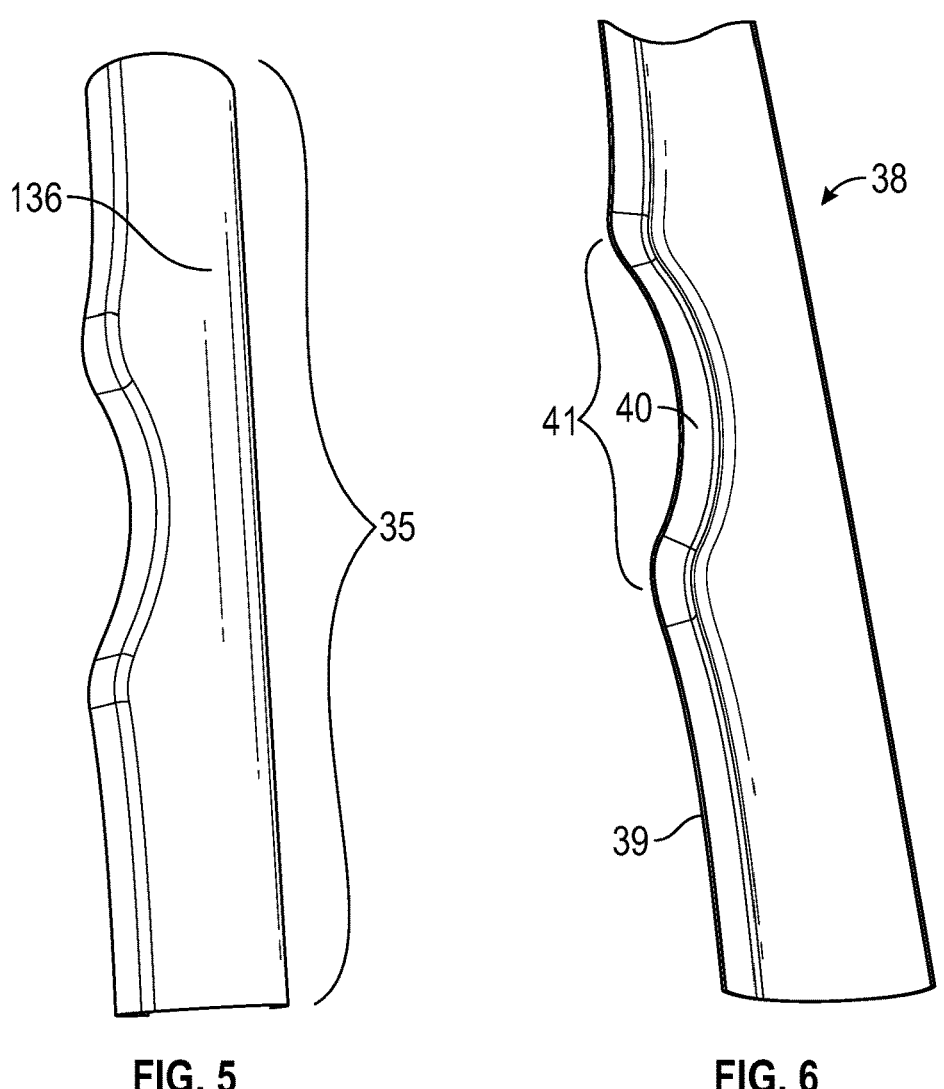
FIG. 5                                FIG. 6
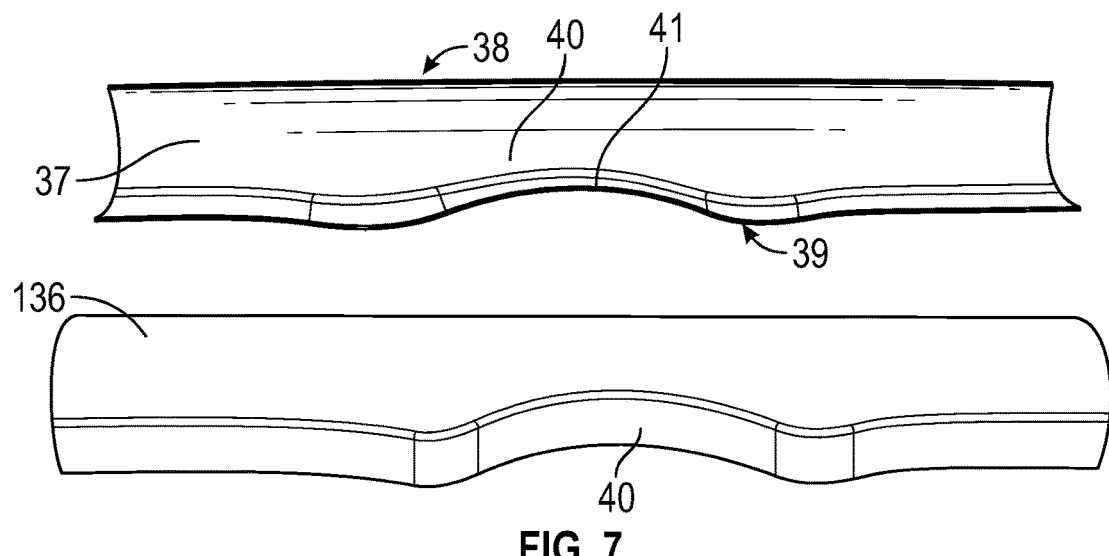
FIG. 7

CARBON FIBER SKATEBOARD HANGER WITH METAL SHIELD

BACKGROUND OF THE INVENTION

1. Field of the Invention

The present invention relates to skateboard hangers and more particularly to skateboard hangers designed to withstand and enhance sliding tricks.

2. Description of Related Art

Skateboards are commonly used for recreation and transportation and therefore must be both durable and allow for smooth riding. As skateboard maneuvers and "stunts" evolve to become more complex and advanced, skateboard design must evolve to deliver resilient equipment that has ability to withstand the inevitable stresses associated with common skateboard operation and "tricks."

Skateboards, including but not limited to mini cruiser skateboards, classic skateboards, "double kick popsicle" skateboards, "the carve" skateboards, "classic longboard" skateboards, "downhill" longboard skateboards, and electric skateboards are generally constructed from three main components; a skateboard deck, two skateboard trucks, and four wheels attached to outward ends of the trucks. The skateboard deck refers to the flat board, often constructed from wood or layered laminated wood, that riders stand on when riding a skateboard. The skateboard "trucks" refer to the components mounted to the underside of the skateboard that hold the skateboard, generally a few inches, above the ground. Skateboard trucks also support the rider's weight, distributing the weight to the wheels, and facilitating the skateboard's movement. Trucks often feature mechanical elements that enable riders to navigate in different directions, execute turns, and achieve aerial maneuvers.

Trucks are generally constructed from a baseplate, a kingpin, a hanger, bushings, and axles. Baseplates are traditionally flat, solid metal plates mounted to the underside of the skateboard deck. The baseplate may provide stability and rigidity to the skateboard truck. Furthermore, the baseplate may join the hanger to the deck via a kingpin which connects both the baseplate to the skateboard deck and the hanger to the baseplate. The hanger is generally a T-shaped component that bears the brunt of the force, impact, and shock that occur during tricks such as "riding the rails,". Additionally, the hanger holds the axel on which the skateboard wheels are mounted, allows the wheels to spin freely, contributes to the stability and control of the skateboard, plays a role in distributing the rider's weight throughout the skateboard, and couples the deck to the wheels. While hangers were traditionally constructed from steel, lighter alternatives are currently available. For example, carbon fiber hangers are advantageous due to their lightweightness and durability. A lightweight hanger allows for increased maneuverability and agility, the reduced weight positively impacts the rider's performance, allowing for an increase in control, speed, and maneuverability, particularly while airborne. The bushings are two small rubber cups that pivot when the rider leans to one side, the bushings may be located around the hanger, and enable the skateboard to turn and be steered. Finally, the axles connect the wheels to the hanger.

A common skateboard trick, often referred to as "grinding a rail", involves sliding or "grinding" along a metal or concrete rail using the underside of the skateboard deck or the underside of the skateboard hanger, rather riding on the skateboard wheels. When grinding a rail, the friction between the hanger and rail may compromise the integrity of the hanger's structure. While steel hangers may be durable, their weight makes the heavy hangers unsuited for use in skateboards where riders expect to perform "tricks" or "stunts" such as riding rails. On the other hand, while lightweight hangers, such as carbon fiber hangers are preferable for "tricks" due to their weightlessness, carbon fiber may suffer from breaks, cracks, wear and tear, and abrasions upon impact with rails. Therefore, there is a great need for smooth and lightweight, yet durable and tough hangers where the hanger will be light enough and smooth enough for riders to easily perform tricks while being tough enough to withstand impact with metal and concrete rails. The present invention presents a carbon fiber hanger reinforced with an aluminum plating, combining the lightweight benefits of carbon fiber hangers with the durability, smoothness, and resilience required for executing tricks, grinding, and sliding.

While there are skateboard shields known in the art, such shields are constructed to prevent wheel damage and are therefore attached to the lateral surface of the hanger. Such shields are intended to protect the axle and wheel from damage rather than protecting the hanger itself. These shields are also designed to protect the skateboard from dust and dirt accumulation. The shields do not provide a smooth riding surface for tricks, nor do the shields protect the hanger from cracking during "tricks" such as "grinding a rail".

Others invented a multi-wheeled truck wherein the skateboard is supported by a suspension system irrespective of the angle between the board and the surface below it. Such suspension systems minimize the challenges presented when skateboard wheels interact with uneven terrain, making tricks smoother. Still, a suspension does not reduce hanger damage resulting from hanger impact with metal, concrete, etc. While hangers of mixed material may be used with the aforementioned suspension systems, a method for producing strong, tough, smooth hangers composed from a combination of metals or a combination of metal and carbon fibers has not been disclosed.

A kingpin clamping device that limits kingpin movement combined with a pivot alignment system is also known in the art. Such systems remove wheel "chatter", improving skateboard safety and control at high speeds. While "chatter" eliminating systems are particularly helpful during tricks, chatter systems do not impact the damage caused to the hanger during tricks. Therefore, while chatter-eliminating devices may be coupled with carbon fiber-metal composite hangers, no suggestion or motivation as to how to construct such hangers is provided in the art.

Methods for integrating carbon fiber or aluminum beam stiffeners within hangers are also known. While beam stiffeners may strengthen hangers, beam stiffeners do not protect the external surface of the hanger from damage upon contact with solid, unyielding materials such as metal or concrete. Hence, considering the shortcomings of existing skateboards, there is a significant demand for a hanger that is lightweight and sleek, while simultaneously providing robustness, durability, and toughness.

It is therefore a primary object of the present invention to provide a light-weight and/or reinforced hanger for a skateboard, and method for making same.

These and other objects of the present invention will become apparent to those skilled in the art as the description thereof proceeds.

SUMMARY OF THE INVENTION

The present invention is directed to a skateboard truck assembly. The assembly may include a kingpin, a plurality of bushings, a baseplate configured with both a pivot recess configured to support a pivot cup and with an aperture configured to accept said kingpin, a plurality of wheels. A hanger may include a first truck and a second truck mounted to an underside of a skateboard deck. The first and second trucks each may include a first and second hanger, respectively, wherein each of the first and second hangers house a first and second axle, respectively, set through, the first and second axles defining a first and second axle axis, the axes parallel one another. The first and/or second hanger preferably includes a smooth unyielding protective shield encasing or covering at least a portion of the top edge of said hanger. A pivot stem may project from the mid portion of an exterior side of a hanger. A ring-shaped hollow may be set within a rounded vertex of an interior side of the hanger, with the hollow sandwiched between two bushing and configured to accept said kingpin.

Preferably, the protective shield spans between ninety and one hundred twenty millimeters across the top edge of the hanger. The protective shield should be made of a shock resistant material, such as aluminum, and/or steel. The protective shield may have a thickness ranging from point one millimeters thick to one and a half millimeters thick, and should sit flush against the remaining portions of the hanger. The shield may be shaped into a hollow truncated cylinder with a straight top edge, a bottom edge wherein a portion of the bottom edge curves into a concave arc such that said bottom edge can partially encircle a ring-shaped hollow.

The hanger may be molded from carbon fibers and said protective shield is co-molded with said hanger. The axle may be permanently fixed within said hanger such that the axle cannot rotate within the hanger.

The present invention also includes a method for constructing a skateboard hanger made of carbon fiber with a partially encased a protective shield. Resin-impregnated carbon fiber sheets may be rolled around a set axle to form a first rod as an axle-wrapped-rod. The sheets may be further rolled into two additional rods. The first rod may be set within a hanger-shaped-mold such that the axle-wrapped-rod forms a top edge of the hanger. Two additional rods may be bent within the hanger-shaped mold to form a remaining perimeter of the hanger. Unwanted gaps may be filled in the hanger with resin-impregnated carbon fiber sheets. A protective shield may be coupled to the top edge of the hanger with shaped carbon fibers. The material in the hanger-shaped mold may be covered and cured with the carbon fibers and protective shield set therein. Afterwards, the hanger-shaped mold may be uncovered, allowing for trimming of unwanted carbon fibers from a cured product, whereby the cured product may be removed from within the mold. The cured product may be cured again within the mold after unwanted carbon fibers are trimmed away. Resin may be set between the protective shield and carbon fibers.

A method for constructing a skateboard hanger made of carbon fiber with a partially encased a protective shield may be formed via setting at least one carbon fiber sheet into a hanger-shaped mold below and around a set axle, the mold may be filled with carbon fiber, while leaving a space for a protective shield, wither on top or within a recess formed along the edge of the hanger. A protective shield can be coupled into or onto a top edge of the hanger with shaped carbon fibers. The system may then be covered and cured in the hanger-shaped mold with the carbon fibers and protective shield set therein.

BRIEF DESCRIPTION OF THE DRAWINGS

The present invention will be described with greater specificity and clarity with reference to the following drawings, in which:

FIG. 5 illustrates a top view of an example of an aluminum shield of an embodiment of the present invention.

FIG. 6 illustrates an underside view of an embodiment of an aluminum shield of an embodiment of the present invention.

FIG. 7 illustrates a perspective view of a pair of aluminum shields (upright and upside down) of an embodiment of the present invention.

DETAILED DESCRIPTION OF THE PREFERRED EMBODIMENTS

General Construction of the Skateboard Truck

Figure 1:
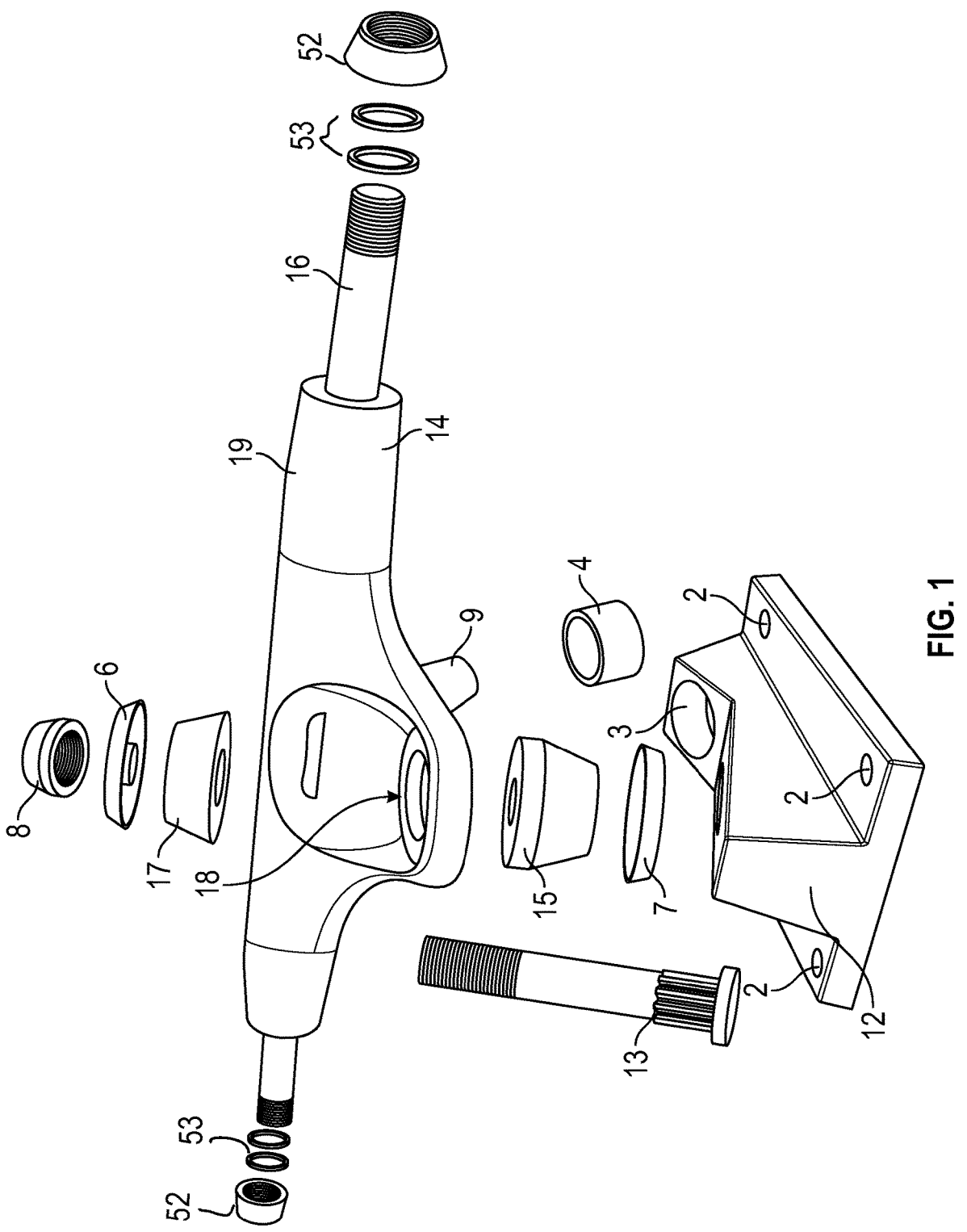
FIG. 1 illustrates an exploded view of a skateboard truck disassembled into its component parts.
Figure 2:
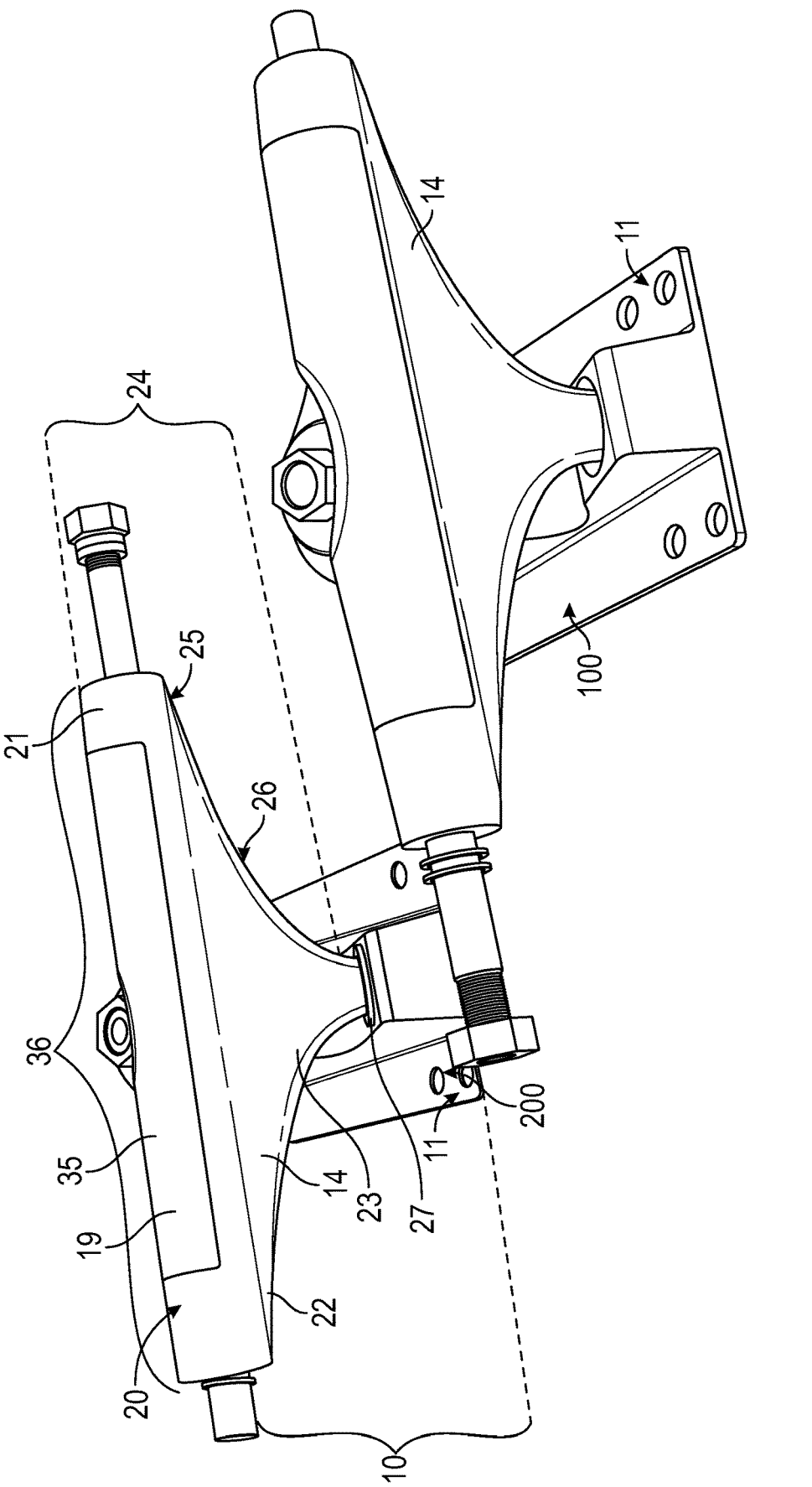
FIG. 2 illustrates a front perspective view of a pair of hangers embedded with an aluminum shield in an embodiment of the present invention.

As seen in FIGS. 1-4, skateboard truck 10 may be mounted to skateboard deck, such that skateboard truck 10 lifts deck (not shown) above the ground. Additionally, truck 10 is useful in providing deck with stability, enabling riders to easily turn and maneuver the skateboard. Truck also serves to absorb shocks and vibrations to promote a smooth ride, distribute rider weight evenly across the skateboard, and provide a smooth surface for grinding and sliding on solid surfaces and obstacles. Truck 10 may be constructed from baseplate 12, kingpin 13, bottom bushing 15, top bushing 17, hanger 14, and axle 16. Axle may be defined by rod 42 and capped with axle nut 52 and set by axle washers 53. As seen in FIG. 2, in some embodiments, skateboards may be assembled with two identical trucks, namely front truck 100 and back truck 200. In other embodiments, front truck 100 is narrower and more responsive than back truck 200, enabling quick turns and maneuverability. In some embodiments, front truck 100 may be constructed to be lightweight with a low profile, compared to back truck 200. In other embodiments, front truck 100 and back truck 200 are similar in size, shape, and mass. In some embodiments, front truck. 100 and back truck 200 are dissimilar.

As seen in FIGS. 1-4, in some embodiments, baseplate 12 may be constructed from a metal or metal alloy and is mounted directly to the underside of deck via deck plate 11. Baseplate 12 may be etched with, or otherwise contain, mounting holes 2 such that baseplate 12 may be fastened to deck at multiple points through deck plate 11. Baseplate 12 may be fastened to deck with bolts or other fasteners known to those skilled in the art. In some embodiments, baseplate 12 may be statically secured to the underside of deck via deck plate 11 via a bolt or screw inserted through each mounting hole 2. Baseplate 12 may also contain pivot recess 3 that holds pivot cup 4. In some embodiments, pivot recess 3 may be circular. In some embodiments pivot cup 4 may be cylindrical or barrel shaped. Pivot cup 4 is preferably constructed from a rubber, rubberlike, or urethane material.

Pivot cup 4 may be designed to provide a secure connection and smooth movement between hanger 14 and baseplate 12.

As seen in FIGS. 1-4, kingpin 13 may protrude downward from baseplate 12. In some embodiments, kingpin 13 may be a large bolt running through both baseplate 10 and hanger 14 that attaches baseplate 10 to hanger 14. In some embodiments, kingpin 13 may be tightened or loosened to adjust the skateboard's responsiveness, maneuverability, and steering capacity.

Bottom bushing 1S and top bushing 17 enable the skateboard to rotate, by pivoting when a rider leans left or right. Bottom bushing 15 may be attached below ring shaped hollow 18 in hanger 14, preferably between ring-shaped hollow 18 and baseplate 10. Bottom bushing 15 serves as a cushioning element that may absorb shocks and impacts from the ground, providing stability and enhancing smoothness. Top bushing 17 may be attached above bottom bushing 15 and is housed above ring shaped hollow 18 in hanger 14. Top bushing 17 may function as a cushioning element, providing flexibility and responsiveness during turns and "tricks". In some embodiments, both top bushing 17 and bottom bushing 15 may be conical in shape. In other embodiments, top bushing 17 and bottom bushing 15 may be cylindrical in shape.

As seen in FIG. 1 and FIG. 2, hanger 14 may be tapered, having two T-shaped or curvilinear triangle-shaped faces, that connect at top edge 19 but angle away from each other as the faces near baseplate 12. Hanger 14 is traditionally the heaviest and sturdiest component of skateboards. Axle 16 may pass through top edge 19, which runs straight from first end 20 to second end 21. A wheel or plurality of wheels may be secured at each end of axle 16. Are 33, which is the rounded vertex on hanger 14, may also contain a ring-shaped hollow 18. Ring-shaped hollow 18 may be sandwiched between top bushing 17 and bottom bushing 15. In some embodiments, upper washer 6 is positioned above top bushing 17, and lower washer 7 is positioned below bottom bushing 15.

Kingpin 13 may protrude downwards from baseplate 10 passing through lower washer 7, bottom bushing 15, ring-shaped hollow 18, top bushing 17, and upper washer 6. Following upper washer 6, kingpin nut 8 may be attached to kingpin 13, securing hanger 14, and all of the aforementioned hardware including lower washer 7, bottom bushing 15, ring-shaped hollow 18, top bushing 17, and upper washer 6 to baseplate 10. Hanger 14 may also be constructed with a protrusion, pivot stem 9, on which hanger 14 pivots. Pivot stem 9 may rest within pivot cup 4, providing a second connection between hanger 14 and baseplate 10.

It was often preferable that hanger 14 be constructed from strong durable materials, such as steel. But, while steel hangers were traditionally used in skateboard construction, lightweight hangers may be preferable over steel hangers, as lightweight hangers allow for superior skateboard maneuverability, control, speed, and agility. It is optimal that hanger 14 be lightweight while simultaneously durable, tough, and impact-resistant, as hanger 14 endures substantial impact during a skateboard ride. For example, some hangers known in the art are fashioned from aluminum, as aluminum is durable and strong, yet only a third as heavy as steel.

In a preferred embodiment, hanger 14 may be constructed from carbon fibers or layered carbon fiber sheets. Such carbon fiber hanger bodies can be reinforced with an embedded shield of metal, such as aluminum or steel, or hardened plastic or like material useful as a shield to protect against blunt and/or sheer forces. Such a composition is preferable over hangers constructed entirely from aluminum, as carbon fiber may be lighter and/or more flexible than aluminum, yet may provides superior strength, having a strength 3.8 times greater than that of aluminum. Although carbon fiber possesses superior strength, the fiber's extremely rigid nature, with a stiffness approximately one point seven times greater than that of aluminum, makes it prone to cracks and breakage upon impact. Therefore, it is preferable that hangers constructed from carbon fiber be embedded, or otherwise shielded with a shock-resistant shield, such as an aluminum shield, such that hanger 14 will not crack upon impact with solid, unyielding materials. The optimal skateboard hanger, which is lightweight, durable, and shock resistant, is achieved by coupling the strength and low weight of carbon fibers with the shock resistance of aluminum. Hangers of any shape and/or size may be constructed of the preferred lightweight materials and embedded with an impact-resistant shield.

Hanger Material and Shape

Carbon fibers are fibers consisting of at least approximately ninety percent (mass fraction) carbon, usually in the non-graphitic state. Carbon fibers may be constructed from thin strands of carbon atoms bonded to form a crystalline structure. These carbon fibers may be combined with a resin matrix, including but not limited to epoxy, improving carbon fiber's strength, durability, and chemical resistance. Carbon fibers may have a specific strength of approximately two thousand four hundred fifty-seven. In some embodiments, a single carbon fiber is twenty-five hundredths of a millimeter thick. The strength of carbon fiber is developed when multiple fibers are woven together, and in some embodiments, stacked on top of one another. In some embodiments, carbon fibers may be shaped by compression molding. In some embodiments, carbon fibers may be coated in resin or plastic. Carbon fibers may also be components in a matrix and mixed with materials including but not limited to concrete, epoxy, or plastic. Carbon fibers may also be co-molded with other materials, including but not limited to steel and aluminum. Skateboard hangers constructed from carbon fiber may be compression molded into any suitable hanger shape.

As seen in FIG. 2, in some embodiments hanger 14 may be tapered, having two T-shaped or curvilinear triangle-shaped faces, exterior side 24 and interior side 28 that connect at top edge 19, but angle away from each other as the faces near baseplate 12. Exterior side 24 of hanger 14 may be a curvilinear triangle having a tube-shaped top edge 19, that runs from first end 20 to second end 21. First hanger side 22 may descend from first end 20, curving inwards to form concave arc 23. Second hanger side 25 may descend from second end 21, curving inwards to form concave arc 26. Concave are 23 and concave are 26 may converge at hanger terminal end 27. Terminal end 27, may form pivot stem 9, which contains pivot cup 4 and connects hanger 14 to base plate 12. In some embodiments, the face of exterior side 24 may be curved inward, rather than level.

Figure 3:
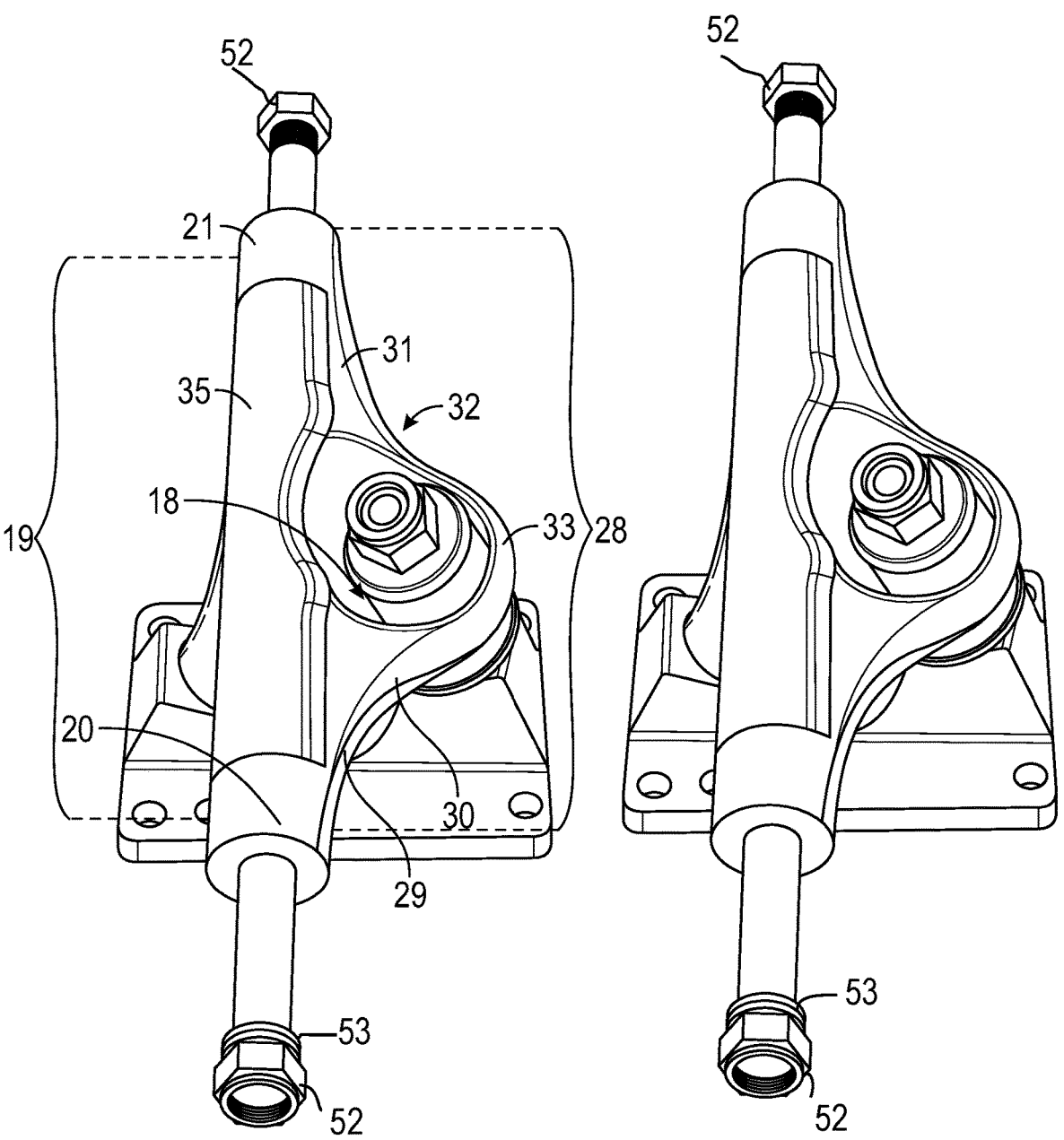
FIG. 3 illustrates a top view of a pair of hangers embedded with an aluminum shield in an embodiment of the present invention.
Figure 4:
FIG. 4 illustrates a rear perspective view of a pair of hangers embedded with an aluminum shield in an embodiment of the present invention.

As seen in FIG. 3 and FIG. 4, interior side 28 of hanger 14 may also be shaped into a curvilinear triangle with a rounded vertex, having a tube-shaped top edge 19. Top edge 19 may run straight from first end 20 to second end 21. First end 20 may give rise to first back hanger side 29, which curves inward forming concave arc 30. Second end 21 may give rise to second back hanger side 31, which curves inward forming concave are 32. In some embodiments, concave arc 30 and concave are 32 may converge to form the rounded vertex, arc 33, wherein Ring-shaped hollow 18 is situated. It is preferable that ring-shaped hollow 18 be large enough to accommodate Kingpin 13. Bottom bushing 15 and top bushing 17 may sandwich ring-shaped hollow 18. In some embodiments, ring-shaped hollow 18 is bordered by are 33 while also partially extending into top edge 19.

As interior side 24 and exterior side 28 are tapered, and diverge away from each other, ring-shaped hollow 18 may pass through exterior side 28, creating an aperture that runs through exterior side 28, down into hanger underside 70, without also passing through interior side 24. Kingpin 13 may pass through baseplate 12 and into underside 70, and exterior side 28 (through ring-shaped hollow 18), without passing through interior side 24.

In some embodiments, it is preferable that hollow channel 36 runs across the width of top edge 19, such that channel 36 run laterally through, and parallel to top edge 19. It is preferable that the diameter of channel 36 be constructed to correspond with the diameter of axle 16 such that axle 16 or axel rod 42 can be inserted through, and secured within, channel 36, anchoring axle 16, and therefore the wheels to hanger 14. In some embodiments, carbon fiber sheets may be directly wrapped around and layered over axle 16 to form channel 36. In such embodiments, axle 16 is bound within channel 36, and a hollow channel 36 need not be constructed.

When set upon a skateboard deck it is preferable that exterior side 24 on front truck 100 face toward first board end 101 and exterior side 24 on back truck 200 face towards second board end 201. On each truck, it is preferable that interior side 28 faces towards the center of deck plate 11.

It is preferable that top edge 19 be sheathed in protective shield 35, such that protective shield 35 encapsulates width 135 of top edge 19, extending slightly onto exterior side 24 and interior side 28. In a preferred embodiment, protective shield 35 encapsulate top edge 19 asymmetrically, such that a larger area of exterior side 24 is encapsulated that that of interior side 28. In some embodiments, protective shield 35 does not shield the entire length of top edge 19. Rather, in the lateral direction, protective shield 35 need only encapsulate the portions of top edge 19 that come into contact with rails during "grinding" and other "tricks". In some embodiments, protective shield 35 may only cover a portion of top edge 19, such that protective shield 35 does not extend, or only partially extends to front side 24. In some embodiments, protective shield 35 may be ninety-nine millimeters in length, and centered, in the lateral direction, on top edge 19, such that the terminal portions of first end 20 and second end 21 remain uncovered by protective shield 35.

Protective shield 35 may be constructed from aluminum, steel, or any other smooth, solid, unyielding, impact-resistant material. Due to aluminum's lightweight nature, aluminum is a preferable material for protective shield 35. It is preferable that the thickness of shield 35 be optimized such that shield 35 is thick enough to be sufficiently impact resistant while thin enough to avoid adding unnecessary weight to hanger 14. In some embodiments aluminum protective shields 35 may range from point one millimeter thick to one and a half millimeters thick. For example, in one preferred embodiment where protective shield 35 is constructed from aluminum, the thickness of protective shield 35 may be point six millimeters. In an alternative preferred aluminum embodiment, protective shield 35, may but point eight millimeters thick.

In some embodiments, as seen in FIG. 5, FIG. 6, and FIG. 7 protective shield 35 may be a hollow cylindrical half shell, hollow truncated cylinder, or hollow cylindrical wedge. In some embodiments rounded portion 136 of protective shield 35 faces outwards from top edge 19, such that protective shield 35 curves around top edge 19. The radius of protective shield 35 may be but is not necessarily 9 mm. As seen in FIG. 7, in some embodiments first lateral side 38 may be a straight edge, while second lateral side 39 may curve into a concave arc 41 at center 40 such that concave arc 41 may partially encircle ring-shaped hollow 18. It is preferable that the size and curvature of the concave arc 41 correspond to the size of ring-shaped hollow 18, such that concave arc 41 be flush with the perimeter of ring-shaped hollow 18.

Protective shield 35 may be co-molded to hanger 14. In some embodiments, an adhesive including but not limited to resin, glue, or epoxy may first be applied to interior side 37 (as seen in FIG. 7) of protective shield 35. Shield 35 may then be set upon top edge 19 such that all of, or the majority of top edge 19 is encased in protective shield 35. In some embodiments, the edges of first end 20 and second end 21 may remain uncovered. In some embodiments, a recess (not shown), may be molded onto hanger 14 such that protective shield 35 may be set within said recess. In some embodiments once set within hanger 14 protective shield 35 may be flush with uncovered first end 20 and uncovered second end 21.

Molding Process

Carbon does not possess a significant electronegativity difference between its atoms, making carbon fibers nonpolar. Still, because carbon fibers have a large number of surface atoms, the fibers may bond to one another through Van der Waals forces. Additionally, carbon fibers may be bonded to one another by mechanical interlocking of the fibers in a woven or layered arrangement. In some embodiments, carbon fibers may be covered or embedded or otherwise impregnated with a resin matrix, including but not limited to an epoxy, such that the resin acts as a binding material by filling in gaps between the carbon fibers, and forming a cohesive bond between the fibers once cured. In some embodiments chemical bonding agents including but not limited to silane coupling agents, titanate coupling agents, maleic anhydride, and acrylic coupling agents may be used to enhance the bond between carbon fibers and the resin matrix in which the layers are embedded.

Silane coupling agents may promote adhesion between carbon fibers and resin matrices. Silane coupling agents contain a silane group, which is a functional group having a general structure of $(RO)3-Si-R'-X$, where X is an organofunctional group, R' is a small alkylene linkage, and RO is a hydrolyzable group such as an alkoxy group. When a silane coupling agent comes in contact with moisture, including atmospheric moisture, the silyl group undergoes hydrolysis, wherein the Si—O, silyl, bond is broken, and a Si—OH, silanol, bond is formed. The silanol groups are highly reactive, and readily bond with functional groups, including but not limited to hydroxyl groups or carboxyl groups (—OH and —COOH, respectively), present on the surface of carbon fibers. In some embodiments hydroxyl groups and carboxyl groups are present on the surface of carbon fibers due to oxidation or due to treatment with chemical agents that react with the carbon surface. In some embodiments the silanol groups may undergo condensation reactions with the functional groups present on the surface of the carbon fibers, forming covalent bonds, and thereby a strong attachment between the silane coupling agent and the carbon fiber. Examples of condensation reactions include, but are not limited to, —Si—OH+—OH (on carbon fiber surface)→—Si—O-Carbon-OH —Si—OH+—COOH (on carbon fiber surface)→—Si—O-Carbon-COOH.

These covalent bonds create a strong attachment between the silane coupling agent and the carbon fiber surface.

In addition to binding to the surface of carbon fibers, silanol groups also bind to resins, including but not limited to epoxy resin by undergoing condensation reactions and forming covalent bonds with reactive groups such as epoxy groups (—O—CH2-CH2-O—) or hydroxyl groups (—OH). In some embodiments the silanol group also undergoes polymerization or crosslinking reactions with the resin matrix, forming a stable and durable interface between the carbon fiber and resin matrix.

Titanate coupling agents are organometallic interface chemicals that contain titanium. The molecular formula of titanate coupling agents is XO—Ti—(OY)3, where XO— is the alkoxy group that reacts with the inorganic substrate and —OY is the organofunctional fragment. The Y portion typically contains groups that interact with the polar and nonpolar thermoplastics, thermosets, and binder groups. In some embodiments the organofunctional fragment of the titanate coupling agent interacts with the functional groups on the surface of the carbon fibers, forming covalent bonds between the two materials. While bonding with the carbon fibers, the titanate coupling agent may also bind with reactive sites such as hydroxyl groups or epoxy groups in the resin, forming a bridge between the carbon fibers and the resin.

In some embodiments, carbon fibers are first treated with titanate coupling agents, thereby modifying the surface properties of the carbon fiber such that functional groups capable of binding with a resin form on the surface of the carbon fiber. After such treatment, the carbon fibers may be mixed with a resin, including but not limited to epoxy resin or polyester resin. Due to the titanate coupling agents, there are strong chemical bonds between the carbon fiber and resin. After admixture, the resin may be cured with heat, pressure, a combination thereof, or any other method known to those skilled in the art. During the curing process, the titanate coupling agents may further react with the resin, forming chemical bonds that establish strong interfacial adhesion between the resin and carbon fibers.

In some embodiments, maleic anhydride similarly functions to strengthen the bond between carbon fibers and resins. Maleic anhydride, having the chemical formula $C_2H_2(CO)_2$, reacts with the surface functional groups on the surface of carbon fiber. After being activated by heat, ultraviolet radiation, or a catalyst, maleic anhydride, acting as an electrophile, reacts with a nucleophilic functional group on the surface of carbon fiber, forming an intermediate, and a covalent bond between the carbon fiber and maleic anhydride. Maleic anhydride is regenerated when the intermediate undergoes an elimination reaction. The reaction between maleic anhydride and carbon fibers introduces maleic anhydride functional groups (—COOH or —CO) onto the carbon fiber surface. These functional groups can then participate in subsequent reactions, such as reactions with amines or other reactive sites in the resin matrix, leading to the formation of strong chemical bonds at the fiber-resin matrix interface.

In some embodiments the carbon fibers may be treated with the acrylic coupling agents, either by dipping, spraying, or other application methods known to those skilled in the art. Once the acrylic coupling agent is absorbed onto the surface of the carbon fiber, functional groups, such as methacrylate and acrylate, present in the acrylic coupling agent react with the functional groups present on the surface of the carbon fibers, resulting in covalent bonds and crosslinking reactions. The modified carbon fibers, with the acrylic coupling agent bonded to their surface, have a higher affinity for the resin matrix, as the functional groups of the coupling agent provide sites for chemical interaction with the resin, promoting adhesion. Additionally, during the curing process, the reactive functional groups of the acrylic coupling agent on the carbon fiber surface further react with the resin matrix. Resulting in the formation of chemical bonds or strong intermolecular forces between the fibers and the resin, improving interfacial adhesion.

Figure 8:
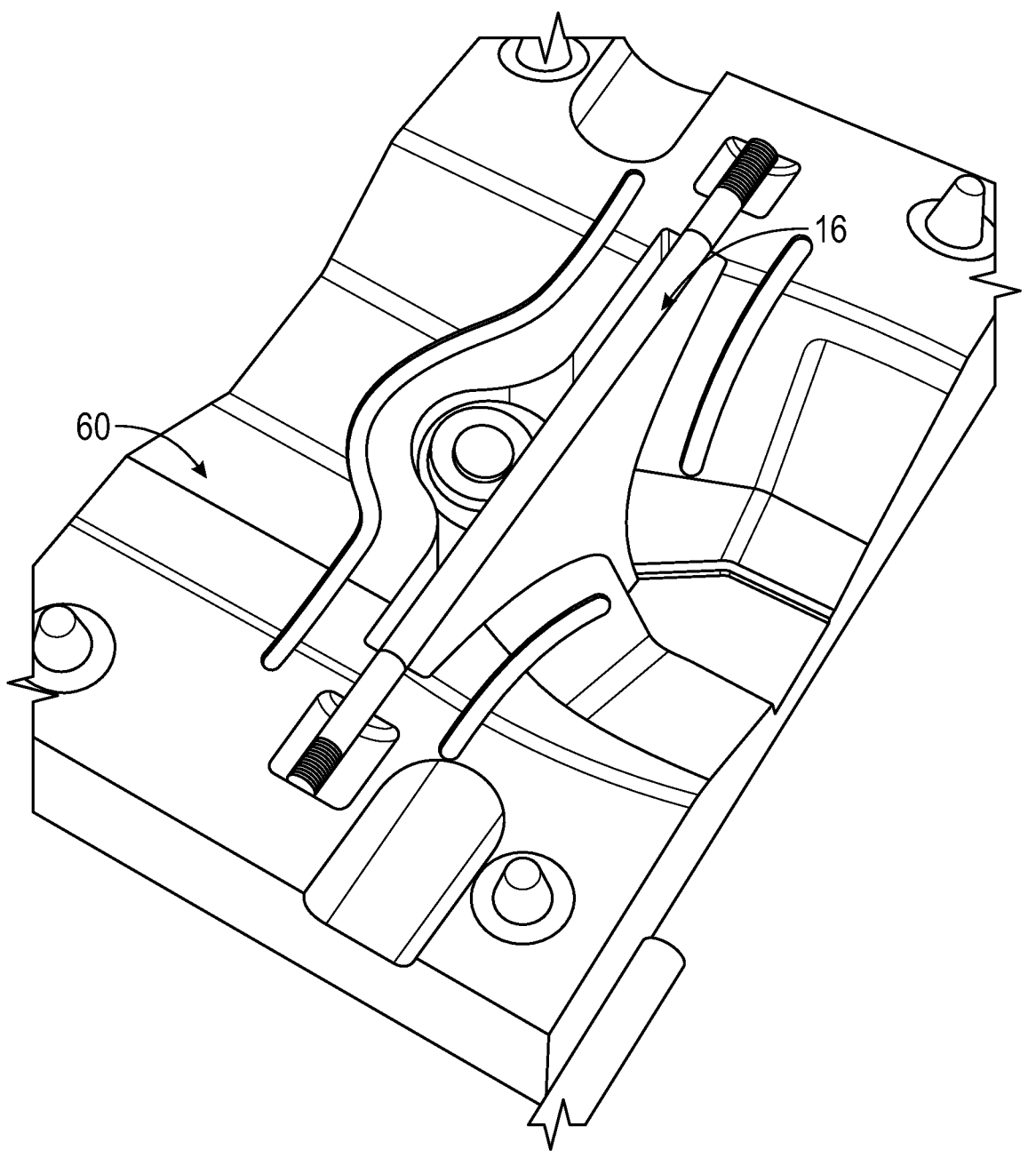
FIG. 8 illustrates a view top perspective view of an embodiment of a mold useful to create a hanger embodiment of the present invention.
Figure 9:
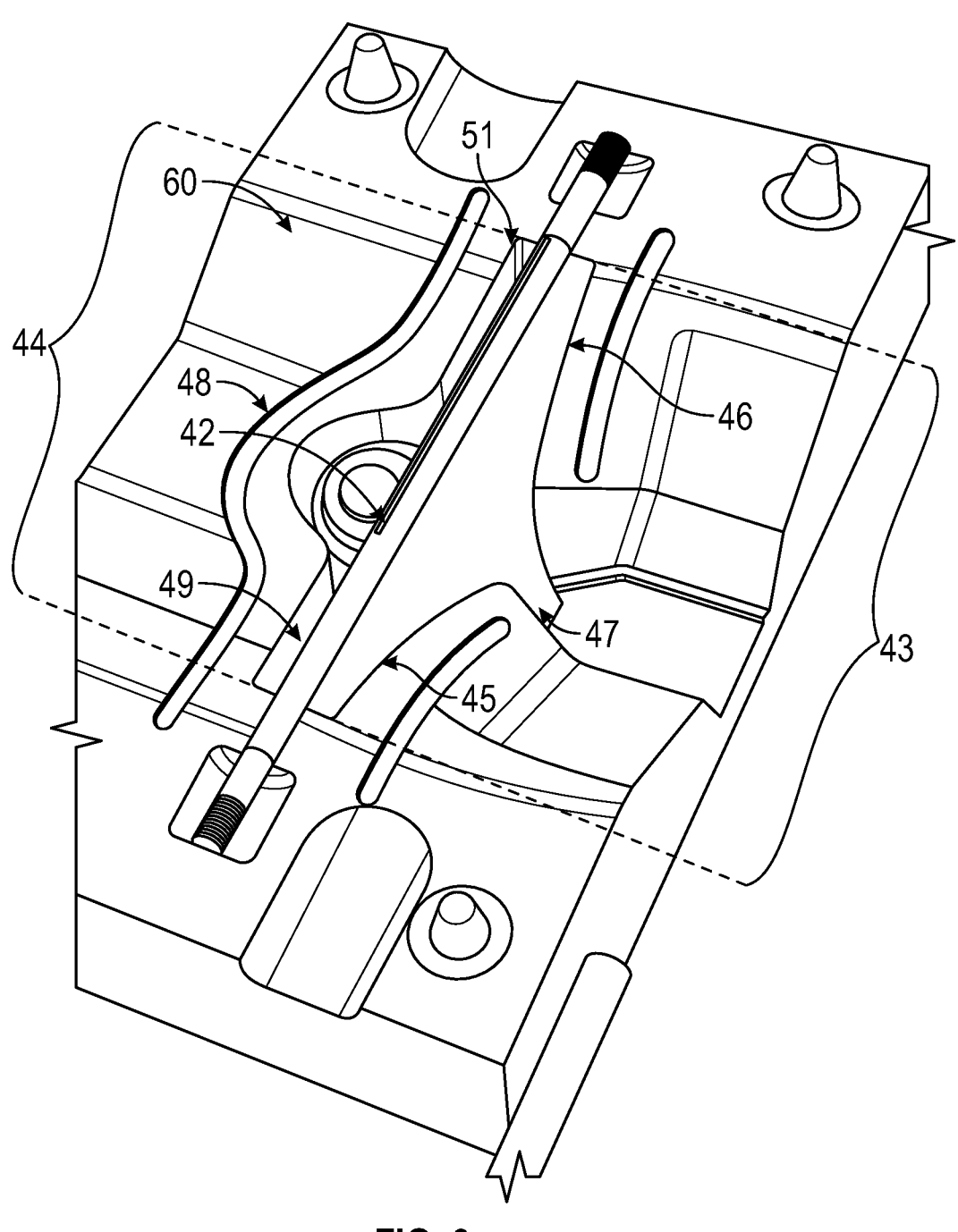
FIG. 9 illustrates a top view of an embodiment of the mold with rods set within the mold.

The following process is exemplary in nature and not intended to limit the scope of the present invention. In some embodiments, the process for molding carbon fiber hanger 14 coupled with protective shield 35 may be performed as follows To form carbon fiber(s) into hanger 14, mold 60, as seen in FIG. 8 and FIG. 9 having the shape of hanger 14, including but not limited to the herein disclosed shape, any other suitable shape, or any shape otherwise known in the art, may first be constructed. In some embodiments mold 60 may be a metal, metal composite, or any other suitable material. It is preferable that mold 60 have the shape and dimensions of the final hanger. In some embodiments, mold 60 may be, but is not necessarily, a Computer Numerical Control (CNC) machined mold wherein a hanger-shaped cavity is embossed into a solid block, such as but not limited to a solid metal block.

Once mold 60 is prepared, carbon fiber sheets may be prepared for molding through treatment with resin. In some embodiments, the carbon fiber sheets may additionally be treated with coupling agents, as herein described. It is preferable that the sheets first be treated with (a) coupling agent(s), followed by resin(s). In some embodiments, pretreated sheets commonly known as "prepreg" materials may be used, eliminating the need to treat the carbon fiber sheets with resin and/or coupling agents.

If necessary, in some embodiments the treated carbon fiber sheets or prepreg materials may be cut such that the sheets properly fit within mold 60. The sheets may be layered within mold 60, preferably layer by layer according to the desired orientation and fiber alignment. In some embodiments, adhesive films or other materials may be added between the layers of carbon fiber. In some embodiments, additional materials, including but not limited to foam or honeycomb cores, may be added between the carbon fiber layers enhancing hanger's 14 strength and structure.

In some embodiments, as seen in FIG. 9, rather than layering the carbon fiber sheets, the sheets may be rolled, preferably into three rod-like structures that may be bent and curved to form the frame of hanger 14. In such embodiments a first rod, rod 42 may be formed by wrapping carbon fiber sheets around axle 16. In some embodiments, more preferably, the carbon fiber sheets may be tightly wrapped around axle 16 of solid material, such as steel, such that steel axle 16 is fixed within rod 42. In a preferable embodiment, approximately four layers of carbon fiber sheets may be wrapped around axle 16 to form rod 42. A second rod, rod 43 may be formed by first rolling a single sheet of "prepreg", or treated carbon fiber into the form of a rod. Rod 43 may then be folded along the perimeter of the mold such that first end 45 and second end 46 of rod 43 take on the form of the perimeter of concave are 23 and concave arc 26 respectively, while the folded center of rod 43, center 47 forms terminal end 27 and pivot stem 9. It is preferable that rod 43 be positioned alongside rod 42 within the mold such that rod 42 forms hanger 14's top edge 19, while rod 43 forms the two legs of the curvilinear triangle; concave are 23, and concave are 26, and pivot stem 9 that constitute exterior side 24 of hanger 14 (as seen in FIG. 2).

A third rod, rod 44 may be rolled from "prepreg" or treated carbon fiber. It is preferable that rod 44 be set within the mold, forming the perimeter of interior side 28 of hanger 14. In some embodiments, it is preferable that mold 60 include circular protrusion 50, such that rod 44 center 48 may be rounded around said circular protrusion, forming ring-shaped hollow 18. It is preferable that first end 49 form hanger back side 29 and concave are 30, while second end 51 form hanger back side 31 and concave arc 32 (as seen in FIG. 3). It is preferable that rod 44 meet rod 42 within the mold by positioning first end 49 and second end 51 at each end of rod 42.

Once the three perimeter encircling bounding rods, rod 42, rod 43, and rod 44 are set within mold 60, a carbon fiber sheet or series of carbon fiber sheets may be layered to close the gap between rod 42 and rod 43. The gap between rod 42 and rod 44 should not be filled in, as the aforementioned gap forms ring-shaped hollow 18, wherein kingpin 13 may be secured.

In some embodiments, a protective shield 35 shaped and sized recess is pressed into the carbon fibers, along rod 42 such that once attached, protective shield 35 is flush with hanger 14. In a preferred embodiment, protective shield 35 may be co-molded with hanger 14, such that protective shield 35 is attached to hanger 14 during the hanger molding process, ensuring a strong durable bond between the carbon fibers and protective shield 35. In an alternative embodiment, protective shield 35 may be attached to hanger 14 with countersunk rivets, or with fasteners that extend from shield 35 through hanger 14, into skateboard deck through deck plate 11. As described above, in some embodiments, protective shield 35 may be shaped into a hollow cylindrical half shell, hollow truncated cylinder, or hollow cylindrical wedge. In some embodiments, protective shield's 35 first lateral side 38 may be a straight edge, while second lateral side 39 may curve into a concave arc 41 at center 40 such that concave arc 41 may partially encircle ring-shaped hollow 18.

In a preferred embodiment, protective shield 35 may be constructed from aluminum by punch-cutting an aluminum sheet into a desired shield shape, as known to those skilled in the art. The punch-cut aluminum may then be stamped into the desired curvature. It is preferable that the curvature stamped into the aluminum correspond with the curvature of top edge 19, which is formed from rod 42 in mold 60.

Once protective shield 35 is stamped and curved, it may be placed within mold 60 along top edge 19, which in some embodiments may be formed by rod 42. In some embodiments, protective shield 35 may be placed, within a pre-formed recess, located along top edge 19. In some embodiments, a resin may be applied to protective shield 35 interior side 37 before protective shield 35 is set on the carbon fibers, strengthening the bond between the carbon fibers and aluminum. In other embodiments, the resin may be applied directly to the carbon fibers. After protective shield 35 is set within mold 60, the mold may be closed and placed within an oven, autoclave, or other curing machine(s). In a preferred embodiment, the carbon fiber may cure under a pressure of one hundred ten kilograms per centimeter squared, at a temperature of one hundred fifty degrees Celsius. Other pressures and temperatures at which carbon fibers will cure are also suitable for forming the aluminum-shielded carbon fiber hanger.

After the curing process is complete, the mold cover may be removed. In some embodiments, excess carbon fiber may need to be removed, trimmed, machined away, and/or sanded from ring-shaped hollow 18, to form an appropriately sized and shaped aperture. In some embodiments, once hollow 18 is properly sized and shaped, mold 60 may once again be covered and returned to a curing machine to further cure. After all curing and shaping are complete, hanger 14 may then be removed from mold 60. In some embodiments, release agents or mechanical tools may be necessary to facilitate the demolding process.

I claim:

1. A skateboard truck assembly with a hanger comprising:
   a first truck and a second truck mounted to an underside of a skateboard deck, the first and second trucks each comprising first and second hangers, respectively, wherein each of the first and second hangers housing a first and second axle, respectively, set through, the first and second axles defining a first and second axle axis, said first and second axis parallel one another;
   wherein at least one of said first and second hangers comprise a protective shield encasing or covering at least a portion of the top edge of said hanger, and wherein said at least one of said first and second hangers is molded from carbon fibers.

2. The skateboard truck assembly according to claim 1, further comprising
   a pivot stem projecting from the mid portion of an exterior side of a hanger; and
   a ring-shaped hollow set within a rounded vertex of an interior side of said hanger, said hollow sandwiched between two bushing and configured to accept said kingpin.

3. The skateboard truck assembly according to claim 1 wherein said protective shield spans between ninety and one hundred twenty millimeters across a top edge of said hanger.

4. The skateboard truck assembly according to claim 1 wherein said protective shield is comprised of a shock resistant material.

5. The skateboard truck assembly according to claim 4 wherein said shock resistant material is aluminum.

6. The skateboard truck assembly according to claim 4 wherein said shock resistant material is steel.

7. The skateboard truck assembly according to claim 4 wherein said protective shield has a thickness ranging from point one millimeters thick to one and a half millimeters thick.

8. The skateboard truck assembly according to claim 1 wherein said protective shield sits flush against said hanger.

9. The skateboard truck assembly according to claim 1 wherein said protective shield is shaped into a hollow truncated cylinder comprising:
   a straight top edge;
   a bottom edge wherein a portion of said bottom edge curves into a concave arc such that said bottom edge can partially encircle said ring-shaped hollow.

10. The skateboard truck assembly according to claim 1 wherein said protective shield is co-molded with said hanger.

11. The skateboard truck assembly according to claim 1 wherein said axle is permanently fixed within said hanger such that said axle cannot rotate within said hanger.

12. A method for constructing a skateboard hanger made of carbon fiber with a partially encased a protective shield, said method comprising the steps of:
   rolling resin impregnated carbon fiber sheet around a set axle to form a first rod as an axle-wrapped-rod;
   further rolling resin impregnated carbon fiber sheets into two additional rods;

setting the first rod within a hanger-shaped-mold such that the axle-wrapped-rod forms a top edge of the hanger, and the two additional rods are bent within the hanger-shaped mold to form a remaining perimeter of the hanger;

filling unwanted gaps in the hanger with resin-impregnated carbon fiber sheets;

coupling a protective shield to the top edge of the hanger with shaped carbon fibers;

covering and curing the hanger-shaped mold with the carbon fibers and protective shield set therein;

uncovering the hanger-shaped mold;

trimming unwanted carbon fibers from a cured product;

removing the cured product from within the mold.

13. The method of claim 12 wherein said cured product is again cured within the mold after unwanted carbon fibers are trimmed away.

14. The method of claim 12 wherein a resin is set between said protective shield and said carbon fibers.

15. A method for constructing a skateboard hanger made of carbon fiber with a partially encased a protective shield, said method comprising the steps of:

setting at least one carbon fiber sheet into a hanger-shaped mold below and around a set axle;

filling the mold with carbon fiber, while leaving a space for a protective shield;

coupling the protective shield into to a top edge of the hanger with shaped carbon fibers.

16. The method set forth in claim 15 further comprising the steps of covering and curing the hanger-shaped mold with the carbon fibers and protective shield set therein.

\* \* \* \* \*